(12) United States Patent
Zhang et al.

(10) Patent No.: US 9,986,517 B2
(45) Date of Patent: May 29, 2018

(54) METHOD FOR OPTIMIZATION OF TRANSMIT POWER CONTROL

(71) Applicant: Telefonaktiebolaget LM Ericsson (publ), Stockholm (SE)

(72) Inventors: Zhang Zhang, Beijing (CN); Jan Christoffersson, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days. days.

(21) Appl. No.: 15/521,382

(22) PCT Filed: Nov. 19, 2014

(86) PCT No.: PCT/CN2014/091615
§ 371 (c)(1),
(2) Date: Apr. 24, 2017

(87) PCT Pub. No.: WO2016/078033
PCT Pub. Date: May 26, 2016

(65) Prior Publication Data
US 2017/0311272 A1  Oct. 26, 2017

(51) Int. Cl.
*H04W 52/28* (2009.01)
*H04W 52/18* (2009.01)
*H04W 52/04* (2009.01)

(52) U.S. Cl.
CPC ......... *H04W 52/288* (2013.01); *H04W 52/18* (2013.01); *H04W 52/28* (2013.01); *H04W 52/04* (2013.01)

(58) Field of Classification Search
CPC .......................................... H04W 52/06–52/60
See application file for complete search history.

(56) References Cited

FOREIGN PATENT DOCUMENTS

| EP | 1063782 | A2 | 12/2000 |
|---|---|---|---|
| EP | 2088694 | A1 | 8/2009 |

OTHER PUBLICATIONS

Author Unknown, "Technical Specification Group Radio Access Network; Physical layer procedures (FDD) (Release 10)," Technical Specification 25.214, Version 10.0.0, 3GPP Organizational Partners, Sep. 2010, 99 pages.
Ericsson, "R1-142414: On Control Channel Robustness for Secondary Pilot and ILPC Restriction Schemes," 3rd Generation Partnership Project (3GPP), TSG RAN WG1 Meeting #77, May 19-23, 2014, 6 pages, Seoul, Korea.
Huawei et al., "RP-121436: Proposed SID: Study on UMTS Heterogeneous Networks," 3rd Generation Partnership Project (3GPP), Work Item, TSG RAN Meeting #57, Sep. 4-7, 2012, 5 pages, Chicago, USA.

(Continued)

*Primary Examiner* — Raymond Dean
(74) *Attorney, Agent, or Firm* — Withrow & Terranova, PLLC (57) ABSTRACT

A technique is disclosed for reducing a number of transmissions of power control signals to a wireless device in a communication network. The technique is performed in the communication network or a network node and involves the determining if the wireless device is implementing a routine for discarding a power control signal. The technique further involves the reducing of the number of transmissions of power control signals to the wireless device based on the determining if the wireless device is implementing a routine for discarding a power control signal.

15 Claims, 7 Drawing Sheets

(56) References Cited

OTHER PUBLICATIONS

Wiberg, Niclas et al., "Combining of Power Control Commands During Soft Handover in WCDMA," 14th IEEE International Symposium on Personal, Indoor and Mobile Radio Communication Proceedings (PIMRC), Sep. 7-10, 2003, IEEE, pp. 1757-1760.
International Search Report and Written Opinion for International Patent Application No. PCT/CN2014/091615, dated Aug. 24, 2015, 7 pages.

METHOD FOR OPTIMIZATION OF TRANSMIT POWER CONTROL

This application is a 35 U.S.C. § 371 national phase filing of International Application No. PCT/CN2014/091615, filed Nov. 19, 2014, the disclosure of which is incorporated herein by reference in its entirety.

TECHNICAL FIELD

The disclosure relates to Transmit Power Control (TPC) of wireless networks, and more specifically to a way of reducing the number of TPC transmissions to a wireless device.

BACKGROUND

Heterogeneous Network

The large uptake of mobile broadband has resulted in significantly increased traffic volumes that need to be handled by the networks, for example Wideband Code Division Multiple Access (WCDMA) and High Speed Packet Access (HSPA). Techniques allowing cellular operators to manage their network more efficiently are therefore of great importance. For example, a few such techniques by which it is possible to improve the downlink performance could involve 4-branch MIMO, multi-flow communication, and multi carrier deployment.

Since the spectral efficiency per link is approaching theoretical limits, a next step could be to improve the spectral efficiency per unit area. In other words, additional features for HSDPA need to be introduced to provide a uniform user experience anywhere inside a cell. This can be done by changing the topology of traditional networks. Currently, the 3rd Generation Partnership Project (3GPP) is working on this aspect by considering heterogeneous network deployments.

Deployment of low-power nodes (LPNs) is seen as a powerful tool to meet the ever-increasing demand for mobile broadband services. A LPN may correspond, for example, to a remote radio unit (RRU), a pico base station, or a micro base station allowing the network capacity to expand in a cost-efficient way. It should be noted that the power that is transmitted by these LPNs is relatively small compared to that of macro base stations, e.g. 2W as compared 20W for a typical macro base station.

A network consisting of traditional macro NodeBs and LPNs is referred to as a Heterogeneous Network (HetNet). Two examples of use-cases for heterogeneous network deployment that may be envisioned are coverage holes and capacity enhancement for localized traffic hotspots.

Figure 1:
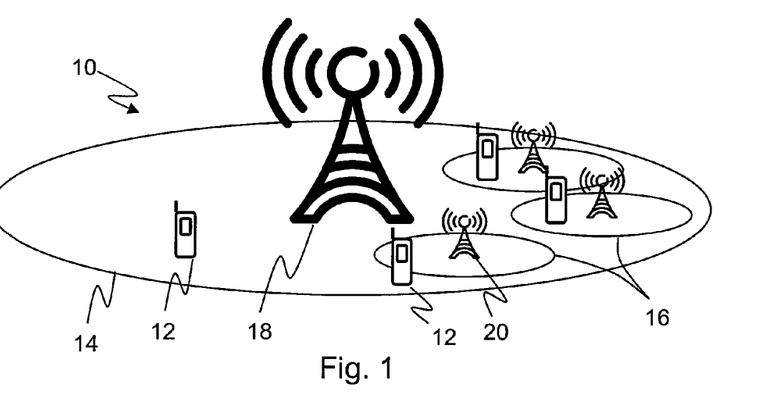
FIG. 1 is a schematic illustration of heterogeneous network in which the present invention may be applied.

Deployed LPNs in a heterogeneous network are typically classified as either co-channel, where each LPN has its own cell identity or scrambling code, or combined cell, where the LPNs have the same cell identities as the macro cell. A co-channel heterogeneous network 10 deployment is illustrated in FIG. 1 showing a macro node 18 providing a macro cell 14. A number LPNs provide cells 16 located within the macro cell 14. Wireless devices 12 are located within the macro cell 14, and some of the wireless devices 12 are located at or within the cells 16.

Figure 2:
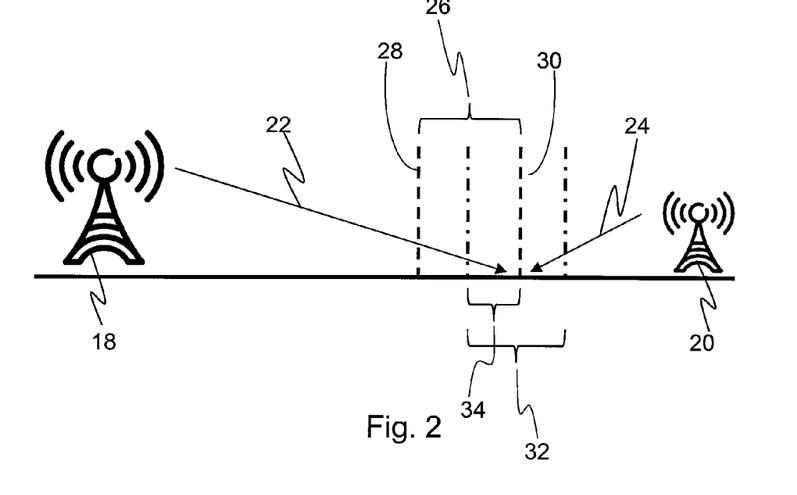
FIG. 2 is a flow-chart illustrating the method performed in the communication network or network node according to the embodiments.

The fact that the different transmit powers of Macro nodes and LPNs creates an inherent Uplink (UL)/Downlink (DL) imbalance region in which the UL quality is better at LPN while the DL quality is better from macro. A scenario involving an imbalance region 26 between the transmissions 22 of macro node 18 and the transmissions 24 of a LPN 20 is illustrated in FIG. 2. The imbalance region is on one side delimited by a border 28 at which the path loss is equal and an UL handover is optimal, and on the other side by a border 30 at which the DL received radio power is equal and a DL handover is optimal. A Soft Hand Over (SHO) region 32 is defined partly covering the imbalance region 26 on the LPN-side, and the overlap region 34 of the SHO region 32 and the imbalance region 26 is served by the macro node 18.

The robustness of control channel may be negatively affected when the User Equipment (UE) is in the imbalance region 26 and in SHO with both macro node(s) and LPN(s), and the macro node provides the serving cell. For example, DL channel quality indication (CQI) and Hybrid Automatic Repeat reQuest HARQ ACKnowledgement (ACK)/Negative-ACKnowledgement (NACK) transmitted on High Speed-Dedicated Physical Control Channel (HS-DPCCH) and the Happy bit with power allocation information transmitted on Enhanced-Dedicated Physical Control Channel (E-DPCCH) may not be received correctly. This is due to the UE transmission power is primarily controlled by the non-serving LPN(s) and the quality of DPCCH and other UL control channels is insufficient for the serving macro node. This will negatively affect both the UL and DL throughput.

On the other hand, UL TPC is carried on Fractional-Dedicated Physical Channel (F-DPCH) and sufficient F-DPCH quality needs to be guaranteed to ensure low enough TPC error. F-DPCH from the non-serving LPN(s) may consume high power due to the bad DL quality from non-serving LPN. Although this may not lead to evident average DL energy increase in LPN, the DL capacity can still be impacted as we have to reserve power for the control channel according to the peak power consumption. Therefore limiting the peak F-DPCH power consumption is also important. With certain type of traffic, e.g. Voice over IP (VoIP), the number of users in the system could be great, and the overall F-DPCH power consumption could be significant. In this case it is more important to limit the F-DPCH power consumption. F-DPCH can be gated or sent intermittently when DPCCH is inactive, but it has to be transmitted when DPCCH is present.

Uplink Inner Loop Power Control

All network nodes in the Active Set (AS) send TPC commands to the UE. The uplink Inner-Loop Power Control (ILPC) adjusts the UE transmit power in order to keep the received uplink Signal- to-Interference Ratio (SIR) at a given SIR target, $SIR_{target}$. Upon reception of one or more TPC commands in a TPC command combining period, the UE derives a single TPC command, TPC_cmd, for each TPC command combining period in which a TPC command is known to be present, i.e. for each period DPCCH is transmitted.

There are two algorithms to derive TPC command. In the first algorithm (Alg. 1), the UE derives TPC_cmd in each slot, which can take a value of either 1 (indicating an increase transmission power) or −1 (indicating a decrease in transmission power). Standard procedure is that the UE will lower its transmission power if one or more TPC commands are DOWN. Only if all TPC commands are UP, it will increase transmission power. This ensures that the lowest possible power for the UE to be heard by at least one of the nodes in the AS is used.

In the second algorithm (Alg. 2), the UE processes the received TPC commands in a 5-slot cycle, and derives one TPC_cmd every 5-slot cycle. When not in SHO, TPC_cmd equals 1 if all 5 hard decisions within a set are "1" and equals −1 if all 5 hard decisions within a set are "−1". Otherwise, TPC_cmd equals "0" (indicating a hold in transmission power). During SHO, a first temporary TPC (TPC_temp) is derived for each radio link set, as in a non-SHO case. The UE then derives a combined TPC_cmd, which is set to TPC_cmd is set to −1 if any of TPC_temp$_i$ equals −1, TPC_cmd is set to 1 if $1/N \cdot \sum_{i=1}^{N}$ TPC_temp$_i$ > 0.5, and TPC_cmd is set to 0 in all other situations.

The second algorithm makes it possible to emulate a smaller step size.

Inner Loop Power Control Restriction

In inner loop power control restriction, the DPCCH is solely power controlled by the serving cell and all other uplink physical channels are set relative DPCCH according to legacy operation. This power control operation is achieved either by having the non-serving cells always issue TPC UP commands, or by having the UE ignore the TPC commands from non-serving cells via an HS-SCCH order. To limit the interference in the non-serving cell(s), the serving grant needs to be reduced via Enhanced-Absolute Grant Channel (E-AGCH) or Enhanced Relative Grant Channel (E-RGCH). By letting the serving cell control the DPCCH implies that the DPCCH SIR in the non-serving cells will increase significantly. To make use of the increased DPCCH SIR in the non-serving cells, the reference value setting can be set more aggressively. The aim is essentially to have roughly the same throughput before and after the decrease in serving grant.

ILPC restriction can be adopted when the UE is in SHO with cells including a serving macro and at least one non-serving LPN. It can guarantee UL control robustness towards the serving macro. The scheme also works for legacy UE when implemented by sending TPC UP commands from LPN(s).

TPC Discarding

The idea behind TPC discarding is to take the radio link quality into account when deriving TPC commands. More specifically, the UE discards the received TPC commands with too poor quality. The quality criteria can for example be TPC error probability or the SIR of F-DPCH channel which carries UL TPC, for example F-DPCH that carries UL TPC. This can avoid that unreliable TPC bits are processed is and misunderstood by the UE leading to degraded UL performance.

Problems with Existing Solutions

As pointed out above, limiting the (peak) F-DPCH power consumption is important to avoid negative impact on DL performance, especially when there are many users in the system. There are certain situations where the transmitted TPC bits are, in some sense, redundant or superfluous even though DPCCH is present. For example, in ILPC restriction, the TPC bits from the non-serving LPNs are just used to disable the ILPC from LPNs, i.e. they do not impact the final ILPC results. Also when ILPC restriction is not used and there is a large imbalance, the UEs in SHO are effectively power controlled by a LPN which has a significantly better UL. In this case the TPC from macro is redundant.

Redundant TPC transmissions can be avoided in several ways. The F-DPCH carrying the redundant TPC can be transmitted with very low power or not transmitted at all, and the UE can discard the corresponding TPC. The second algorithm (Alg. 2) described above can be adopted and the F-DPCH carrying the redundant TPC can be transmitted with very low power or simply not transmitted, in which case it is very likely that the redundant TPC over the 5 slots is perceived as "0" (indicating a hold in transmission power). The UE can also be informed to ignore the TPC via a new HS-SCCH order.

In this context, low power means the power with which F-DPCH cannot be reliably received. F-DPCH is power controlled and adopting a transmitted power that significantly lower (e.g. −10 to −20 dB, or even turn off) than the power given by power control will certainly lead to a failed reception However, there are certain problems with the above solutions. TPC discarding is not specified in the 3GPP specifications. Thus, it is likely that some UEs do not implement this feature. Further, the second solution adopting the second algorithm (Alg. 2) may work even if the UEs do not implement TPC discard. However, this may meet a problem if the number of nodes transmitting redundant TPC is equal to or more than the number of nodes transmitting effective TPC. In this case, the sum of TPC_temp$_i$ will never be greater than 0.5, i.e. the UE cannot increase its transmission power. Moreover, the effective power control step size of the second algorithm (Alg. 2) is small (⅕ dB), which may not be enough. Further, a new HS-SCCH order is not backwards compatible.

The relative F-DPCH power consumption can be high when the DL quality is bad. This can for example happen for transmission from LPN when there is large imbalance region, as is explained above. The DL performance can be negatively affected as power has to be reserved for the control channel according to the peak power consumption.

SUMMARY

It is therefore an object to address the technical challenges outlined above, and to reduce the required power for TPC transmissions in a communication network. It is also an object to optimize the reduction of redundant transmissions of power control signals with respect to the functions of wireless devices and to soft hand over scenarios between different cells. These objects and other objects are achieved by the methods, the communication network, and the nodes according to the independent claims, and by the embodiments according to the dependent claims.

In accordance with a first aspect, a method for reducing a number of transmissions of power control signals to a wireless device in a communication network is provided. The method is performed in the communication network and comprises: determining if the wireless device is implementing a routine for discarding a power control signal. The method further comprises: reducing the number of transmissions of power control signals to the wireless device based on the determining if the wireless device is implementing a routine for discarding a power control signal.

In accordance with a second aspect, a method is provided for reducing a number of transmissions of power control signals to a wireless device in a communication network comprising a network node. The method is performed in the network node and comprises the same steps as the method according to the first aspect.

In accordance with a third aspect, a method is provided for reducing a number of transmissions of power control signals to a wireless device in a communication network comprising a first network node and a second network node. The method is performed in the first network node and comprises: determining if the wireless device is implementing a routine for discarding a power control signal. The method further comprises: generating an instruction for the second network node to reduce the number of transmissions of power control signals to the wireless device, wherein the instruction is based on the determining if the wireless device is implementing a routine for discarding a power control signal. Additionally, the method comprises: transmitting the instruction to the second network node.

In accordance with a fourth aspect, a method is provided for reducing a number of transmissions of power control signals to a wireless device in a communication network comprising a network node. The method is performed in the network node and comprises: receiving an instruction for reducing the number of transmissions of power control signals to the wireless device, wherein the instruction is based on a determining if the wireless device is implementing a routine for discarding a power control signal, and reducing the number of transmissions of power control signals to the wireless device based on the instruction.

For each of the aspects above, the determining if the wireless device is implementing a routine for discarding a power control signal may comprise: transmitting one or more power control signals below a threshold power to the wireless device, and receiving a transmission from the wireless device subsequent to the transmission of each power control signal. Additionally, the routine for discarding a power control signal may comprise: measuring the power of each transmission from the wireless device, and determining if the routine for discarding power control signals is implemented by the wireless device based on the measured power of each transmission from the wireless device.

In accordance with a fifth aspect, a system for reducing a number of transmissions of power control signals to a wireless device in a communication network is provided. The system is configured to: determine if the wireless device is implementing a routine for discarding a power control signal, and reduce the number of transmissions of power control signals to the wireless device based on the determining if the wireless device is implementing a routine for discarding a power control signal.

In accordance with a sixth aspect, a network node for a communication network is provided. The network node is configured to transmit a number of power control signals to a wireless device and to: determine if the wireless device is implementing a routine for discarding a power control signal. The network node is further configured to: reduce the number of transmissions of power control signals to the wireless device based on the determining if the wireless device is implementing a routine for discarding a power control signal.

In accordance with a seventh aspect, a first network node for a communication network comprising a second network node configured to transmit a number of power control signals to a wireless device is provided. The first network node is configured to: determine if the wireless device is implementing a routine for discarding a power control signal. The network node is further configured to: generate an instruction for the second network node to reduce the number of transmissions of power control signals to the wireless device, wherein the instruction is based on the determining if the wireless device is implementing a routine for discarding a power control signal, and to transmit the instruction to the second network node.

In accordance with an eighth aspect, a network node for a communication network is provided. The network node is configured to transmit a number of power control signals to a wireless device and to: receive an instruction for reducing the number of transmissions of power control signals to the wireless device, wherein the instruction is based on a determining if the wireless device is implementing a routine for discarding a power control signal. The network node is further configured to: reduce the number of transmissions of power control signals to the wireless device based on the instruction.

The system according to the fifth aspect, the network node according to the sixth aspect, the first network node according to the seventh aspect, and the network node according to the eighth aspect may be further configured to transmit one or more power control signals below a threshold power to the wireless device, and receive a transmission from the wireless device subsequent to the transmission of each power control signal. They may be further configured to measure the power of each transmission from the wireless device, and determine if the routine for discarding power control signals is implemented by the wireless device based on the measured power of each transmission from the wireless device.

The above described technologies allow for an optimization of the transmissions of power control signals in a communication network. An effect of the above aspects of the invention is that transmissions of power control signals in a communication network are reduced in a manner that depends on the implementing of discarding a power control signal, which includes TPC discard. This has the advantage that the reduction of redundant transmissions of power control signals can be optimized with respect to the function of the wireless devices.

As mentioned above, the relative F-DPCH power consumption can be high when the DL quality is bad. This can for example happen for transmission from LPN when there is large imbalance region. The DL performance can be negatively affected as power has to be reserved for the control channel according to the peak power consumption. This is improved by the methods proposed above, by turning off the redundant TPC transmission and let the UE discard the TPC transmissions.

In accordance with a ninth aspect, a method is provided for determining if a wireless device is implementing a routine for discarding a power control signal. The method may be is performed in the network node and comprises: transmitting one or more power control signals below a threshold power to the wireless device, and receiving a transmission from the wireless device subsequent to the transmission of each power control signal. The method further comprises: measuring the power of each transmission from the wireless device, and determining if the routine for discarding power control signals is implemented by the wireless device based on the measured power of each transmission from the wireless device.

In accordance with a tenth aspect, a system, which may be a network node, is provided. The network node is configured to: transmit one or more power control signals below a threshold power to the wireless device, and receive a transmission from the wireless device subsequent to the transmission of each power control signal. The network node is further configured to: measure the power of each transmission from the wireless device, and determine if the routine for discarding power control signals is implemented by the wireless device based on the measured power of each transmission from the wireless device.

Other objects, advantages and features of embodiments will be explained in the following detailed description when considered in conjunction with the accompanying drawings and claims.

DETAILED DESCRIPTION

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Embodiments are described in a non-limiting general context in relation to an example scenario in a SHO scenario with a serving macro node and non-serving LPN(s). However, it should be noted that the embodiments may be applied to handover between cells of different LPNs, and also between cells from the same node. Different embodiments for reducing redundant TPC transmissions in a communication network are described below.

In the first embodiment (A), it is to determine if the UE has implemented TPC discard. This is done by performing a test where a TPC sequence is transmitted at low or even zero power and checking the change in the received power. For example, if a number of TPC UP is transmitted with normal power so that the TPC can be reliably decoded by the UE, the received power should be increased. If the same sequence is transmitted with low or zero power and TPC discard is implemented, the received power should remain fairly constant, except for small changes due to differences e.g. in fading. If the same sequence is transmitted and TPC discard is not implemented, the received power will vary. The variation is random and there could be a bias towards increasing or decreasing depending on the UE implementation. Based on this observation, whether TPC discard is implemented or not can be determined as described below.

The test procedure is performed at several points in time $(t_1, t_2, \ldots, t_{n+1})$ with corresponding measured power changes $(Pdiff_1, Pdiff_2, \ldots, Pdiff_n)$. By increasing the number of measurements n, the confidence level of the test is increased. The points in time $(t_1, t_2, \ldots, t_{n+1})$ do not need to be consecutive. $Pdiff_i$ is calculated as the received power in $t_i$ minus the received power in $t_{i-1}$, where these points in time are consecutive.

TPC discard is determined as implemented if the mean of absolute values of Pdiff is small and/or have a small variance, i.e. $mean(abs(Pdiff_1), abs(Pdiff_2), \ldots, abs(Pdiff_n)) < thr_{mean}$ and/or $var(Pdiff_1, Pdiff_2, \ldots, Pdiff_n) < thr_{var}$, where $thr_{mean}$ and $thr_{mean}$ are threshold values. TPC discard is determined as not implemented if the mean of absolute Pdiff is significant and/or have a significant variance, i.e. $mean(abs(Pdiff_1), abs(Pdiff_2), \ldots, abs(Pdiff_n)) \geq thr_{mean}$ and/or $var(Pdiff_1, Pdiff_2, \ldots, Pdiff_n) \geq thr_{var}$, where $thr_{mean}$ and $thr_{mean}$ are the above threshold values.

The determination may only need to be performed once during the UE life time, and the determination results can be remembered in the core network. When the UE switches to another cell, the cell can request the determination results from the core network.

When a UE that has been classified as having implemented TPC discard, as described in the embodiment (A) above, specific optimizations can be adopted, for instance, turning off certain TPC transmissions regarding F-DPCH transmission. Two example embodiments are given below.

In one embodiment (B), a UE is in SHO with a serving macro cell and non-serving LPN(s) in the AS, and uses ILPC restriction as described in the introduction. In this case, the TPC transmissions from the non-serving LPN(s) are turned off. The UE will discard the TPC from the non-serving LPN(s) and only follow the TPC from the serving macro.

In another embodiment (C), a UE is in SHO with a macro cell and with LPN(s) in the AS and does not use ILPC restriction. In this case the TPC transmissions from the macro cell can be turned off as it is the LPN(s) that actually power controls the UE. This can be done adaptively, i.e. when the imbalance between the macro and the best LPN is sufficiently large, e.g. more than 5 dB, or when the UL quality at the best LPN is sufficiently better than that at the best macro node, e.g. the filtered UL SIR at the best LPN is 5 dB stronger than that at the best macro node.

In a further embodiment (D), for a UE that has been classified as not having implemented TPC discard, F-DPCH transmission should not be turned off and sufficient quality should be guaranteed. In this case some optimization could also be adopted. For instance, in SHO with a serving macro cell and non-serving LPN(s) in the AS, and with ILPC restriction employed, the network determines if it possible and/or useful to remove any LPN from the AS to reduce the power cost from the F-DPCH transmission.

This can be done in several ways. For example, in one embodiment (E), the size of the AS for the UE can be decreased, and/or only one of the LPN(s) can be in the AS, thus avoiding possible F-DPCH transmission from the other LPN(s). The LPN(s) that are (virtually) excluded from the AS can still receive the UL transmission from the UE. Which LPN to include can be based on different criteria, for example the LPN having the average best UL performance can be included, or the LPN having the lowest Guaranteed Bit Rate (GBR) DL traffic load that can afford higher F-DPCH transmission power can be included.

Figure 3:
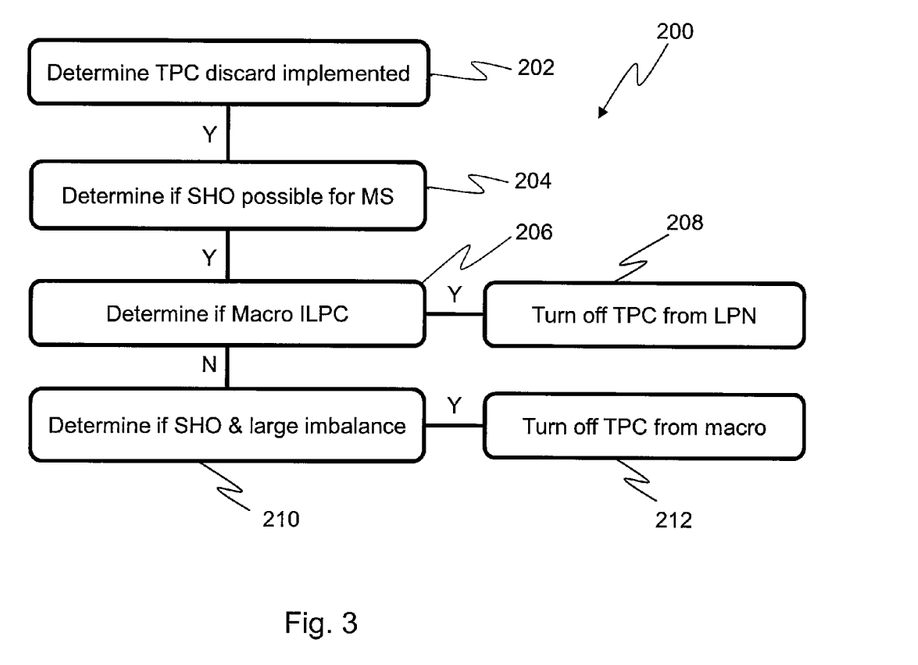
FIG. 3 is a flow-chart illustrating an embodiment of the invention.

A schematic illustration of an embodiment showing a set of actions 200 for UEs with TPC discard implemented is depicted in FIG. 3. It is first determined 202 if TPC discard is implemented. If this is the case (Y), it is determined (204) if SHO is possible for the mobile station (MS). If this is the case (Y), it is determined 206 if the mobile device is solely power controlled by the Macro node. If this is the case (Y), the TPC from the LPN(s) are turned off. If the mobile device is not solely power controlled by the Macro node (N), it is determined if the mobile device is in SHO between the macro node and the LPN(s) ad if there is a large imbalance as described in the introduction. If this is the case (Y), the TPC from the macro node are turned off. It should be noted that these solutions are UE specific and depend on whether the UE has implemented TPC discard or not, i.e. the network may be configured to take the most appropriate actions based on the UE capability.

The above described technology determines whether a UE has implemented TPC discard and adaptively optimize the F-DPCH transmissions based on the TPC discard capability of the UE. The scheme is transparent to the UE and is therefore applicable to legacy UE. The DL performance is enhanced due to less interference and increased power available for DL data transmissions.

In embodiments of the invention, the problem of reducing the number of redundant TPC transmissions in a communication network is addressed by determining if TPC discard, or a routine for discarding power control signals, is implemented.

Figure 4:
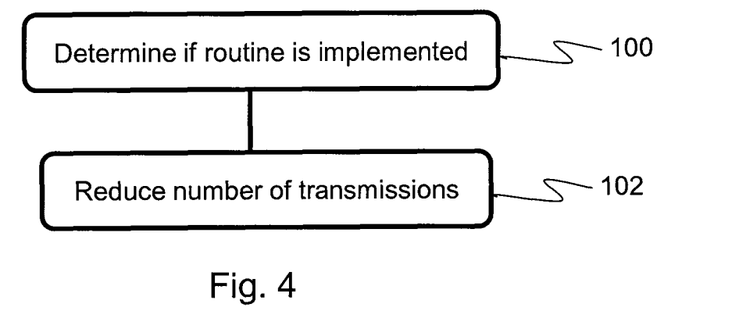
FIG. 4 is a flow-chart illustrating an embodiment of a method performed in a system or a network node for reducing the number of transmissions of power control signals.

An embodiment of a method for reducing a number of transmissions of power control signals to a wireless device 202 in a communication network is illustrated in the block diagram of FIG. 4. The method may be performed in a network node 208, 210 of the communication network. The method comprises:
  determining 100 if the wireless device 202 is implementing a routine for discarding a power control signal, and
  reducing 102 the number of transmissions of power control signals to the wireless device 202 based on the determining 100 if the wireless device 202 is implementing a routine for discarding a power control signal.

Figure 5A:
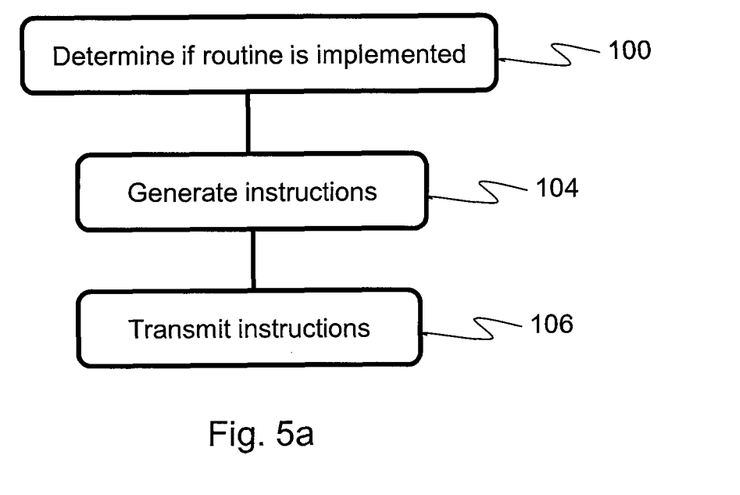
FIG. 5a is a flow-chart illustrating an embodiment of a method performed in a first network node transmitting instructions to a second network node for reducing the number of transmissions of power control signals.

Another embodiment for reducing a number of transmissions of power control signals to a wireless device 202 in a communication network is illustrated in the block diagram of FIG. 5a. The communication network comprises a first network node 208 and a second network node 210. The method is performed in the first network node 208 and comprises:
  determining 100 if the wireless device 202 is implementing a routine for discarding a power control signal,
  generating 104 an instruction for the second network node 210 to reduce the number of transmissions of power control signals to the wireless device 202, wherein the instruction is based 100 on the determining if the wireless device 202 is implementing a routine for discarding a power control signal, and
  transmitting 106 the instruction to the second network node 210.

Figure 5B:
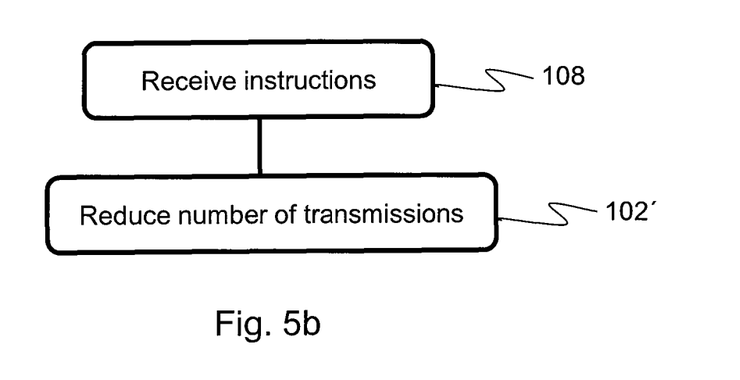
FIG. 5b is a flow-chart illustrating an embodiment of a method performed in a network node receiving instructions for reducing the number of transmissions of power control signals.
Figure 6:
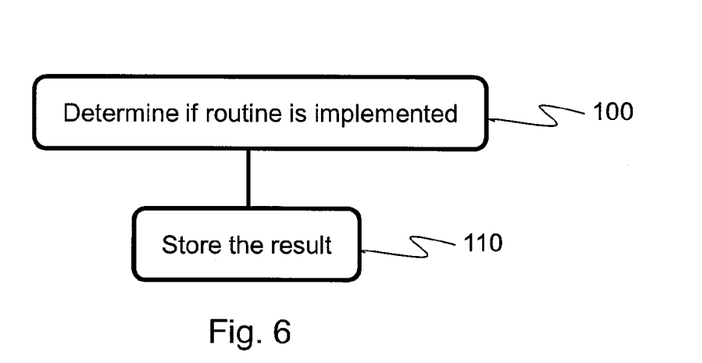
FIG. 6 is a flow-chart illustrating an embodiment of a method performed in a network node for reducing the number of transmissions of power control signals.

Another embodiment for reducing a number of transmissions of power control signals to a wireless device 202 in a communication network is illustrated in the block diagram of FIG. 5b. The communication network comprises a network node 210 and the method is performed in the network node 210 and comprises:
  receiving 108 an instruction for reducing the number of transmissions of power control signals to the wireless device 202, wherein the instruction is based on a determining 100 if the wireless device 202 is implementing a routine for discarding a power control signal, and
  reducing 110 the number of transmissions of power control signals to the wireless device 202 based on the instruction.

The power control signals is here understood to encompass a signal comprising instruction for increasing or decreasing the transmit power of the wireless device 202. Further, an example of a routine for discarding a power control signal is the TPC discarding described in the introduction.

Figure 8:
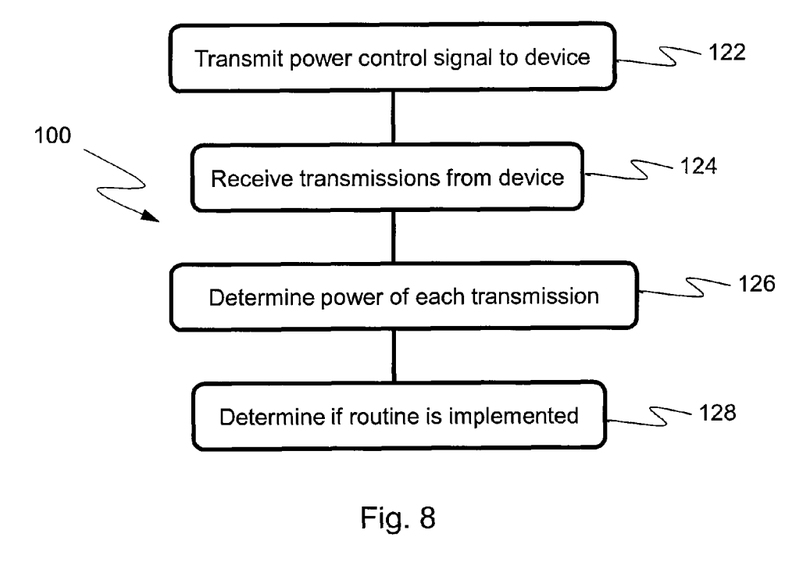
FIG. 8 is a flow-chart illustrating an embodiment of a method performed in a network node for determining if a routine for discarding power control signals is implemented.

In the above embodiments of methods for reducing a number of transmissions of power control signals to a wireless device 202 in a communication network, the determining 100 if the wireless device 202 is implementing a routine for discarding a power control signal may comprise:
  transmitting 122 one or more power control signals below a threshold power to the wireless device 202,
  receiving 124 a transmission from the wireless device 202 subsequent to the transmission of each power control signal,
  measuring 126 the power of each transmission from the wireless device 202, and
  determining 128 if the routine for discarding power control signals is implemented by the wireless device 202 based on the measured power of each transmission from the wireless device 202.

These steps, which are illustrated in the block diagram of FIG. 8, reflect parts of the method of embodiment (A) described above.

The step of determining 128 if a routine for discarding power control signals is implemented may comprise:
  deriving 130 one or more of power differences, wherein each power difference corresponds to the difference in determined power between a pair of consecutive transmissions, and wherein the determining is based on the one or more power differences.

Figure 9:
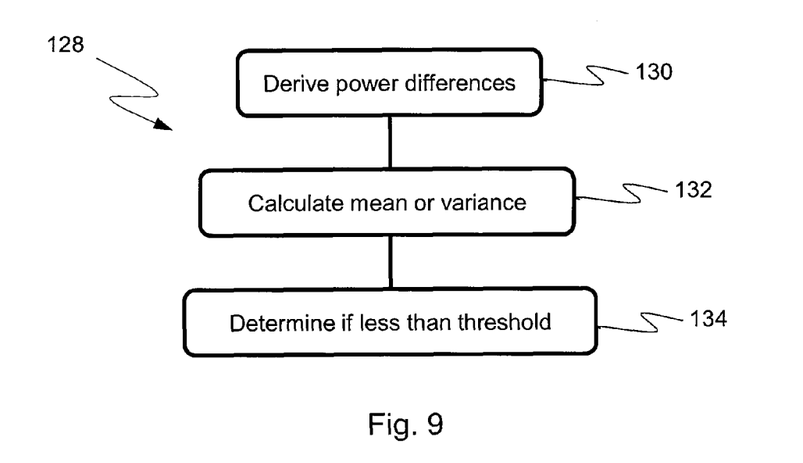
FIG. 9 is a flow-chart illustrating a detailed embodiment of a methods for determining if a routine for discarding power control signals is implemented.

The power differences may be more than one and the step of determining 128 if a routine for discarding power control signals is implemented may, as is illustrated in the block diagram of FIG. 9, comprise:
  calculating 132 the mean of the absolute values of the power differences, and wherein it is determined 134 that a routine for discarding power control signals is implemented if the mean is less than a threshold value.

Alternatively or additionally, with the power differences being more than one, the step of determining 128 if a routine for discarding power control signals is implemented may comprise:
  calculating 132 the variance of the power differences, and wherein it is determined 134 that a routine for discarding power control signals is implemented if the variance is less than a threshold value.

The calculating steps described here overlaps with embodiment (A) above. The threshold value may, for example be 10 pW, 100 pW, or 1 nW.

The determining 100 if the wireless device 202 is implementing a routine for discarding a power control signal may comprise:
  storing 110 the outcome of the determining if a routine for discarding power control signals is implemented.

Figure 7:
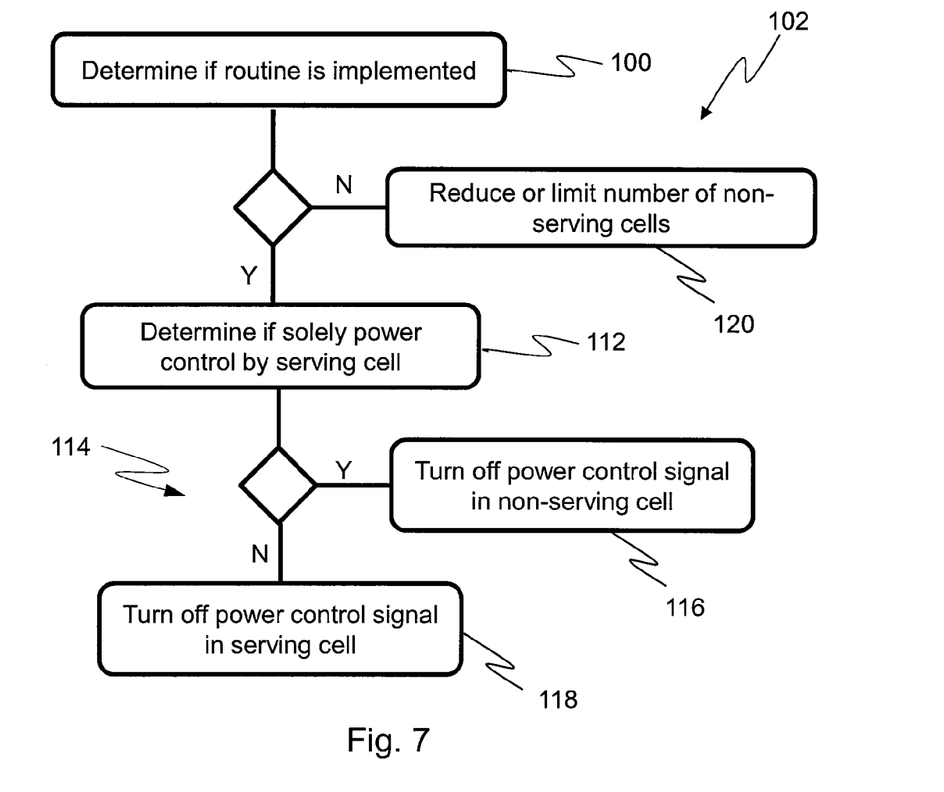
FIG. 7 is a flow-chart illustrating a detailed embodiment of a methods for reducing the number of transmissions of power control signals.

Alternative embodiments of the above methods are illustrated in FIG. 7. In these embodiments, the communication network comprises a serving cell 14 for the wireless device 202 and one or more non-serving cells 16. If the wireless device 202 is solely power controlled 112 by the serving cell 208, and if it is determined that the wireless device 202 is implementing a routine for discarding a power control signal, the step of reducing 102 the number of transmissions comprises:

turning off 116 a power control signal in the one or more non-serving cells 16.

These alternative embodiments overlap with embodiment (B) above. Alternatively, if the wireless device 202 is power controlled by at least one non-serving cell 16, and, if it is determined that the wireless device 202 is implementing a routine for discarding a power control signal, the step of reducing 102 the number of transmissions comprises:

turning off 118 a power control signal in the serving cell 14.

These alternative embodiments overlap with embodiment (C) above. The turning off 118 of a power control signal in the serving cell 14 may be performed based on the quality of a transmission in the serving cell 14 and on the quality of a transmission in the one or more non-serving cells 16. Alternatively, the turning off 118 of any power control signals is performed when the signal-to-interference of an uplink transmission is greater in a non-serving cell 16 than the signal-to-interference of a corresponding uplink transmission in the serving cell 14. In the embodiments above, the wireless device 202 may be in a soft handover between the serving cell 14 and the number of non-serving cells 16.

If the communication network comprises a number of non-serving cells and, and if it is determined that the wireless device 202 is not implementing a routine for discarding a power control signal, the step of reducing the number of transmissions may comprise:

reducing 120 the number of non-serving cells 16.

Alternatively or additionally, the step of reducing the number of transmissions may comprise:

limiting 120 the number of non-serving cells 16 to one non-serving cell 16.

These alternative steps are illustrated in FIG. 7 and partly overlaps with embodiment (D) above. They allow for the redundant TPC transmissions to be removed also for the UE that does not implement TPC discard. The one non-serving cell 16 may have the best uplink performance of the number of non-serving cells 16. Alternatively, the one non-serving cell 16 may have the lowest guaranteed downlink bit rate of the number of non-serving cells 16. The signal-to-interference of the uplink transmission in the non-serving cell 16 may be 5 dB greater than the signal-to-interference of the corresponding uplink transmission in the serving cell 14. In the above embodiments, the wireless device 202 may be in a soft handover between the serving cell 14 and the number of non-serving cells 16.

An embodiment of a method for determining if a wireless device 202 is implementing a routine for discarding a power control signal is illustrated in the block diagram of FIG. 8. The method may be performed in a network node 208, 210 and comprises:

transmitting 122 one or more power control signals below a threshold power to the wireless device 202,     receiving 124 a transmission from the wireless device 202 subsequent to the transmission of each power control signal,     measuring 126 the power of each transmission from the wireless device 202, and     determining 128 if the routine for discarding power control signals is implemented by the wireless device 202 based on the measured power of each transmission from the wireless device 202.

This embodiment may comprise any of the features of the described above in relation to the step of determining 100 if the wireless device 202 is implementing a routine for discarding a power control signal.

Figure 10A:
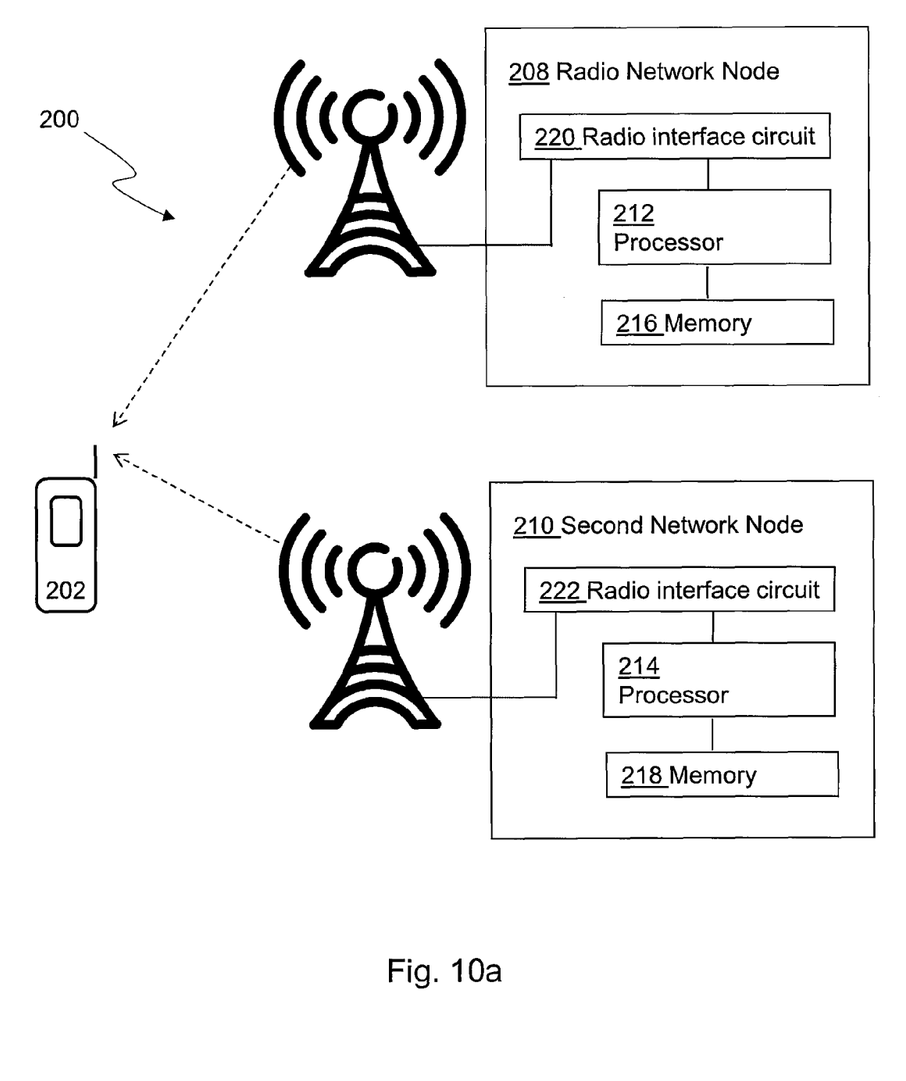
FIG. 10a-b are block diagrams schematically illustrating the system and network nodes according to embodiments.
Figure 10B:
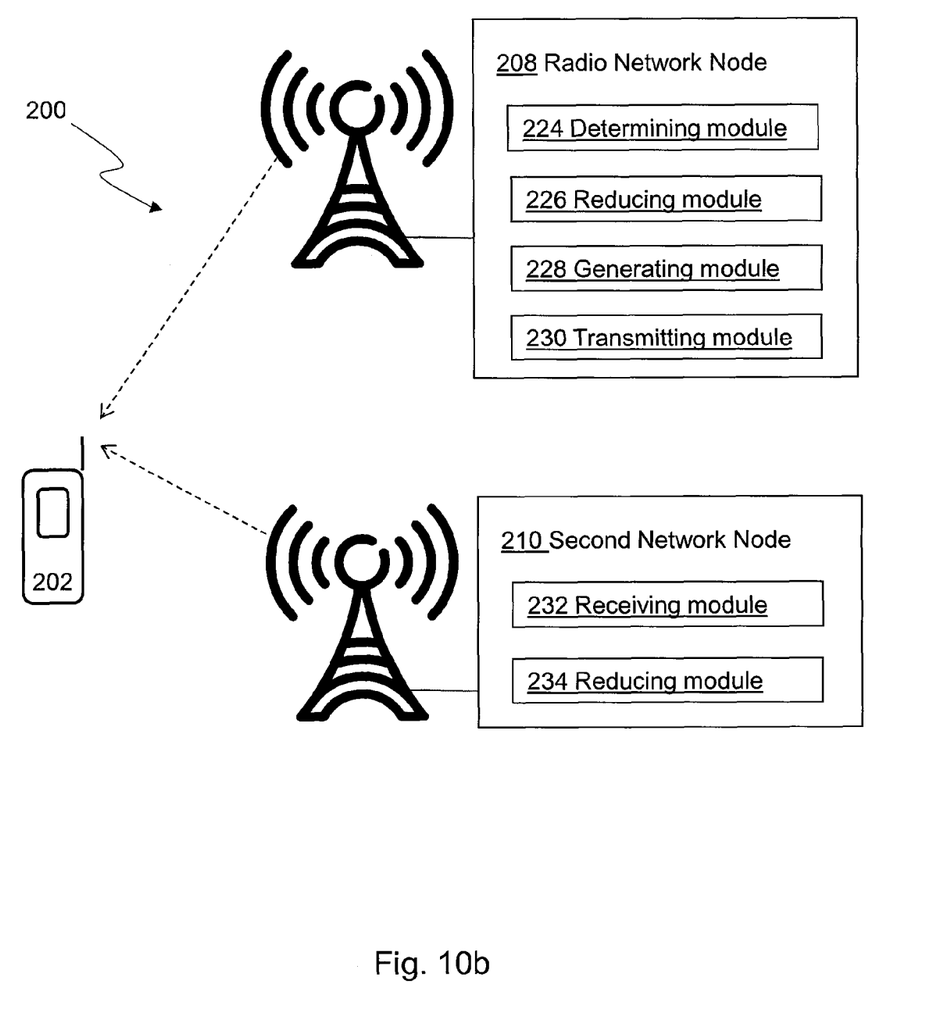

Different embodiments of a system 200 for reducing a number of transmissions of power control signals to a wireless device 202 in a communication network are schematically illustrated in FIG. 10a-b. This means that the wireless device 202 as such does not form part of the system.

In one embodiment, the system 200 is configured to: determine 100 if the wireless device 202 is implementing a routine for discarding a power control signal. The communication network is further configured to reduce 102 the number of transmissions of power control signals to the wireless device 202 based on the determining 100 if the wireless device 202 is implementing a routine for discarding a power control signal.

The system 200 may be a network node 208, 210 constituting a part of the communication network. The network node 208, 210 may be a first network node 208, and the communication network may comprises a second network node 210 configured to transmit a number of power control signals to a wireless device 202. The first network node, in reducing 102 the number of transmissions of power control signals, further be configured to generate 104 an instruction for the second network node 210 to reduce the number of transmissions of power control signals to the wireless device, wherein the instruction is based on the determining 100 if the wireless device 202 is implementing a routine for discarding a power control signal, and to transmit 106 the instruction to the second network node 210.

Another embodiment concerns a system 200 composed of a network node 210 for a communication network. The network node 210 is configured to transmit a number of power control signals to a wireless device 202 and to: receive 108 an instruction for reducing the number of transmissions of power control signals to the wireless device 202. The instruction is based on a determining 100 if the wireless device 202 is implementing a routine for discarding a power control signal. The network node 210 is further configured to: reduce 110 the number of transmissions of power control signals to the wireless device 202 based on the instruction.

In the above embodiments of a system 200 it may, in the determining 100 if the wireless device 202 is implementing a routine for discarding a power control signal may comprise, further be configured to: transmitting 122 one or more power control signals below a threshold power to the wireless device 202, and receive 124 a transmission from the wireless device 202 subsequent to the transmission of each power control signal. The system 200 may, in the same determining 100 further be configured to: measure 126 the power of each transmission from the wireless device 202, and determine 128 if the routine for discarding power control signals is implemented by the wireless device 202 based on the measured power of each transmission from the wireless device 202. The corresponding steps are illustrated in the block diagram of FIG. 8, and the features reflect parts of the method of embodiment (A) described above.

In the determining 128 if a routine for discarding power control signals is implemented, the system 200 may further be configured to: derive 130 one or more of power differences, wherein each power difference corresponds to the difference in determined power between a pair of consecutive transmissions, and wherein the determining is based on the one or more power differences.

The power differences may be more than one, and the system 200 may, in the determining 128 if a routine for discarding power control signals is implemented be configured to: calculate 132 the mean of the absolute values of the power differences, and wherein it is determined 134 that a routine for discarding power control signals is implemented if the mean is less than a threshold value.

Alternatively or additionally, with the power differences being more than one, the system 200 may, in the determining 128 if a routine for discarding power control signals is implemented, further be configured to: calculate 132 the variance of the power differences, and wherein it is determined 134 that a routine for discarding power control signals is implemented if the variance is less than a threshold value.

In determining 100 if the wireless device 202 is implementing a routine for discarding a power control signal, the system 200 may be configured to: storing 110 the outcome of the determining if a routine for discarding power control signals is implemented.

In alternative embodiments, the communication network comprises a serving cell 14 for the wireless device 202 and one or more non-serving cells 16. If the wireless device 202 is solely power controlled 112 by the serving cell 208, and if it is determined that the wireless device 202 is implementing a routine for discarding a power control signal, the system 200 may, in reducing 102 the number of transmissions, further be configured to: turn off 116 a power control signal in the one or more non-serving cells 16.

These alternative embodiments overlap with embodiment (B) above. Alternatively, if the wireless device 202 is power controlled by at least one non-serving cell 16, and, if it is determined that the wireless device 202 is implementing a routine for discarding a power control signal, the system 200 may, in reducing 102 the number of transmissions, further be configured to: turn off 118 a power control signal in the serving cell 14.

These alternative embodiments overlap with embodiment (C) above. The system 200 may be configured to turn off 118 a power control signal in the serving cell 14 based on the quality of a transmission in the serving cell 14 and on the quality of a transmission in the one or more non-serving cells 16. Alternatively, the system 200 may be configured to turn off 118 of any power control signals when the signal-to-interference of an uplink transmission is greater in a non-serving cell 16 than the signal-to-interference of a corresponding uplink transmission in the serving cell 14. In the embodiments above, the wireless device 202 may be in a soft handover between the serving cell 14 and the number of non-serving cells 16.

If the communication network comprises a number of non-serving cells and, and if it is determined that the wireless device 202 is not implementing a routine for discarding a power control signal, the system 200 may, in reducing the number of transmissions may comprise, further be configured to: reducing 120 the number of non-serving cells 16.

Alternatively or additionally, in reducing the number of transmissions may comprise, the system 200 may be configured to: limit 120 the number of non-serving cells 16 to one non-serving cell 16.

These configurations relate to the steps illustrated in FIG. 7 and partly overlap with embodiment (D) above. The one non-serving cell 16 may have the best uplink performance of the number of non-serving cells 16. Alternatively, the one non-serving cell 16 may have the lowest guaranteed downlink bit rate of the number of non-serving cells 16. The signal-to-interference of the uplink transmission in the non-serving cell 16 may be 5 dB greater than the signal-to-interference of the corresponding uplink transmission in the serving cell 14. In the above embodiments, the wireless device 202 may be in a soft handover between the serving cell 14 and the number of non-serving cells 16.

In one embodiment, a system 200, which may be a network node 208, 210, is configured to: transmit 122 one or more power control signals below a threshold power to a wireless device 202, receive 124 a transmission from the wireless device 202 subsequent to the transmission of each power control signal. The system 200 is further configured to: measure 126 the power of each transmission from the wireless device 202, and determine 128 if a routine for discarding power control signals is implemented by the wireless device 202 based on the measured power of each transmission from the wireless device 202. This embodiment may comprise any of the features of the described above for a system 200 and in relation to the determining 100 if the wireless device 202 is implementing a routine for discarding a power control signal.

In embodiments of the invention illustrated in FIG. 10a, the system 200 may comprise a processor 212, 214 and a memory 216, 218. The system 200 may also comprise a radio interface circuit 220, 222 configured to communicate with the wireless device 202, and connected to the processor 212, 214. The memory 216, 218 may comprise instructions executable by the processor 212, 214. The system 200 may thereby be operative to: determine 100 if the wireless device 202 is implementing a routine for discarding a power control signal, and reduce 102 the number of transmissions of power control signals to the wireless device 202 based on the determining 100 if the wireless device 202 is implementing a routine for discarding a power control signal.

In alternative embodiments of the invention, a first network node 208 may comprise a processor 212 and a memory 216. The network node 208 may also comprise a radio interface circuit 220 configured to communicate with the wireless device 202, and connected to the processor 212. The memory 216 may comprise instructions executable by the processor 212. The network node 208 may thereby be operative to: determine 100 if the wireless device 202 is implementing a routine for discarding a power control signal, generate 104 an instruction for the second network node 210 to reduce the number of transmissions of power control signals to the wireless device 202, wherein the instruction is based 100 on the determining if the wireless device 202 is implementing a routine for discarding a power control signal. The network node 208 may further be operative to: transmit 106 the instruction to a second network node 210.

In embodiments of the invention, a network node 210 may comprise a processor 214 and a memory 218. The network node 210 may also comprise a radio interface circuit 222 configured to communicate with the wireless device 202, and connected to the processor 214. The memory 218 may comprise instructions executable by the processor 214. The network node 210 may thereby be operative to: receive 108 an instruction for reducing the number of transmissions of power control signals to the wireless device 202, wherein the instruction is based on a determining 100 if the wireless device 202 is implementing a routine for discarding a power control signal, and reduce 110 the number of transmissions of power control signals to the wireless device 202 based on the instruction.

In an alternative way to describe the embodiment in FIG. 10a, illustrated in FIG. 10b, the system 200, which may be a network node 208, comprises a determining module 224 adapted to determine 100 if the wireless device 202 is implementing a routine for discarding a power control signal, and a reducing module 226 adapted to reduce 102 the number of transmissions of power control signals to the wireless device 202 based on the determining 100 if the wireless device 202 is implementing a routine for discarding a power control signal. Additionally or alternatively to the reducing module 226, the system 200 may comprise a generating module 228 adapted to generate 104 an instruction for the second network node 210 to reduce the number of transmissions of power control signals to the wireless device 202, wherein the instruction is based 100 on the determining if the wireless device 202 is implementing a routine for discarding a power control signal, and a transmitting module 230 adapted to transmit 106 the instruction to a second network node 210.

In an alternative embodiment that is illustrated in FIG. 10b, the network node 210 comprises a receiving module 232 adapted to receive 108 an instruction for reducing the number of transmissions of power control signals to the wireless device 202, wherein the instruction is based on a determining 100 if the wireless device 202 is implementing a routine for discarding a power control signal, and a reducing module 226 adapted to reduce 110 the number of transmissions of power control signals to the wireless device 202 based on the instruction.

The systems 200 described in relation to FIG. 10b may comprise further modules adapted to perform any of the steps of the method described in relation to FIGS. 4-9. The system 200 may also be configured or operate under the conditions described in relation to FIGS. 4-9. The systems 200 described in relation to FIG. 10b may comprise further modules adapted to have the functions and operate under the conditions described in relation to FIG. 10a.

In an alternative way to describe the embodiments of network nodes described in relation to FIG. 10a, the network node 208, 210 comprises a Central Processing Unit (CPU) which may be a single unit or a plurality of units. Furthermore, the network node 208, 210 comprises at least one computer program product (CPP) in the form of a non-volatile memory, e.g. an EEPROM (Electrically Erasable Programmable Read-Only Memory), a flash memory or a disk drive. The CPP comprises a computer program, which comprises code means which when run on the network node 208, 210 causes the CPU to perform steps of the procedure described earlier in conjunction with FIGS. 3-9. In other words, when the code means are run on the CPU, they correspond to the processor 212, 214 of FIG. 10a.

In the above embodiments, the network nodes may be radio network nodes and the wireless device may be a cell phone or the like. The above mentioned and described embodiments are only given as examples and should not be limiting. Other solutions, uses, objectives, and functions within the scope of the accompanying patent claims may be possible.

What is claimed is:

1. A method for reducing a number of transmissions of power control signals to a wireless device in a communication network, wherein the method comprises:
   determining if the wireless device is implementing a routine for discarding a power control signal, and
   reducing the number of transmissions of power control signals to the wireless device based on the determining if the wireless device is implementing a routine for discarding a power control signal.

2. The method according to claim 1, wherein the communication network comprises a network node and the method is performed in the network node.

3. The method according to claim 2, wherein the network node is a first network node, the communication network comprises a second network node, and the step of reducing the number of transmissions of power control signals to the wireless device comprises:
   generating an instruction for the second network node to reduce the number of transmissions of power control signals to the wireless device, wherein the instruction is based on the determining if the wireless device is implementing a routine for discarding a power control signal, and
   transmitting the instruction to the second network node.

4. A method for reducing a number of transmissions of power control signals to a wireless device in a communication network comprising a network node, wherein the method is performed in the network node and comprises:
   receiving an instruction for reducing the number of transmissions of power control signals to the wireless device, wherein the instruction is based on a determining if the wireless device is implementing a routine for discarding a power control signal, and
   reducing the number of transmissions of power control signals to the wireless device based on the instruction.

5. The method according to claim 1, wherein the determining if the wireless device is implementing a routine for discarding a power control signal comprises:
   transmitting one or more power control signals below a threshold power to the wireless device,
   receiving a transmission from the wireless device subsequent to the transmission of each power control signal,
   measuring the power of each transmission from the wireless device, and
   determining if the routine for discarding power control signals is implemented by the wireless device based on the measured power of each transmission from the wireless device.

6. The method according to claim 5, wherein the step of determining if a routine for discarding power control signals is implemented comprises:
   deriving one or more of power differences, wherein each power difference corresponds to the difference in determined power between a pair of consecutive transmissions, and wherein the determining is based on the one or more power differences.

7. The method according to claim 6, wherein the power differences are more than one and the step of determining if a routine for discarding power control signals is implemented comprises:
   calculating the mean of the absolute values of the power differences, and wherein it is determined that a routine for discarding power control signals is implemented if the mean is less than a threshold value.

8. A system adapted for reducing a number of transmissions of power control signals to a wireless device in a communication network, wherein the system is configured to:
   determine if the wireless device is implementing a routine for discarding a power control signal, and
   reduce the number of transmissions of power control signals to the wireless device based on the determining if the wireless device is implementing a routine for discarding a power control signal.

9. The system according to claim 8, wherein the system is a network node.

10. The system according to claim 9, wherein the network node is a first network node, and the communication network comprises a second network node configured to transmit a number of power control signals to a wireless device, wherein, in reducing the number of transmissions of power control signals, the first network node is configured to:

generate an instruction for the second network node to reduce the number of transmissions of power control signals to the wireless device, wherein the instruction is based on the determining if the wireless device is implementing a routine for discarding a power control signal, and transmit the instruction to the second network node.

11. A system for reducing a number of transmissions of power control signals to a wireless device in a communication network, wherein the system is a network node configured to transmit a number of power control signals to a wireless device and to:

receive an instruction for reducing the number of transmissions of power control signals to the wireless device, wherein the instruction is based on a determining if the wireless device is implementing a routine for discarding a power control signal, and reduce the number of transmissions of power control signals to the wireless device based on the instruction.

12. The system according to claim 8, wherein, in determining if the wireless device is implementing a routine for discarding a power control signal, the system is configured to:

transmit one or more power control signals below a threshold power to the wireless device, receive a transmission from the wireless device subsequent to the transmission of each power control signal, measure the power of each transmission from the wireless device, and determine if the routine for discarding power control signals is implemented by the wireless device based on the measured power of each transmission from the wireless device.

13. The system according to claim 12, wherein, in determining if a routine for discarding power control signals is implemented, the system is configured to:

derive one or more of power differences, wherein each power difference corresponds to the difference in determined power between a pair of consecutive transmissions, and wherein the determining is based on the one or more power differences.

14. The system according to claim 13, wherein the power differences are more than one and, in determining if a routine for discarding power control signals is implemented, the system is configured to:

calculate the mean of the absolute values of the power differences, and wherein it is determined that a routine for discarding power control signals is implemented if the mean is less than a threshold value.

15. The system according to claim 13, wherein the power differences are more than one and, in determining if a routine for discarding power control signals is implemented, the system is configured to:

calculate the variance of the power differences, and wherein it is determined that a routine for discarding power control signals is implemented if the variance is less than a threshold value.

* * * * *